United States Patent
Hammad et al.

(10) Patent No.: US 11,055,704 B2
(45) Date of Patent: *Jul. 6, 2021

(54) TERMINAL DATA ENCRYPTION

(71) Applicant: VISA U.S.A. INC., San Francisco, CA (US)

(72) Inventors: Ayman Hammad, Pleasanton, CA (US); Patrick Faith, Pleasanton, CA (US)

(73) Assignee: VISA U.S.A. INC., San Francisco, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 16/154,064

(22) Filed: Oct. 8, 2018

(65) Prior Publication Data
US 2019/0043049 A1    Feb. 7, 2019

Related U.S. Application Data

(60) Division of application No. 13/912,120, filed on Jun. 6, 2013, now Pat. No. 10,134,034, which is a
(Continued)

(51) Int. Cl.
*G06Q 20/38* (2012.01)
*G06Q 20/08* (2012.01)
(Continued)

(52) U.S. Cl.
CPC ......... *G06Q 20/382* (2013.01); *G06Q 20/085* (2013.01); *G06Q 20/20* (2013.01);
(Continued)

(58) Field of Classification Search
None
See application file for complete search history.

(56) References Cited

U.S. PATENT DOCUMENTS 3,956,615 A   5/1976   Anderson et al.
4,186,871 A   2/1980   Anderson et al.
(Continued)

FOREIGN PATENT DOCUMENTS

WO   2007149787   12/2007
WO   2007149787   10/2008

OTHER PUBLICATIONS

Menezes. Alfred J.etal. Handbook of Applied Cryptography. CRC Press. 1997. Available from <http://www.cacr.math.uwaterloo.ca/hac>.*
(Continued)

*Primary Examiner* — Jamie R Kucab
(74) *Attorney, Agent, or Firm* — Kilpatrick Townsend & Stockton LLP

(57) ABSTRACT

A method is disclosed. The method includes generating an initial key after interacting with an access device, storing the initial key at a key storage location, altering the initial key with a public key to form an altered key, and sending the altered key to a server computer along with an identifier for the access device. The altered key is changed to the initial key at the server computer and is stored with the identifier in a database in operative communication with the server computer. The initial keys that are stored at the key storage location and in the database are used to alter and restore transaction data associated with multiple financial transactions that are conducted using the access device.

15 Claims, 8 Drawing Sheets

Related U.S. Application Data continuation of application No. 11/764,351, filed on Jun. 18, 2007, now Pat. No. 8,494,968.

(60) Provisional application No. 60/884,089, filed on Jan. 9, 2007, provisional application No. 60/815,430, filed on Jun. 20, 2006, provisional application No. 60/815,059, filed on Jun. 19, 2006.

(51) Int. Cl.
*G06Q 20/20* (2012.01)
*G06Q 20/36* (2012.01)
*G06Q 20/40* (2012.01)
*G06Q 30/06* (2012.01)
*G06Q 20/10* (2012.01)

(52) U.S. Cl.
CPC ....... *G06Q 20/3674* (2013.01); *G06Q 20/385* (2013.01); *G06Q 20/3821* (2013.01); *G06Q 20/3829* (2013.01); *G06Q 20/40* (2013.01); *G06Q 20/401* (2013.01); *G06Q 30/06* (2013.01); *G06Q 20/105* (2013.01); *G06Q 20/204* (2013.01); *G06Q 2220/00* (2013.01); *H04L 2209/56* (2013.01)

(56) References Cited

U.S. PATENT DOCUMENTS

| | | |
|---|---|---|
| 4,238,853 A | 12/1980 | Ehrsam et al. |
| 4,317,957 A | 3/1982 | Sendrow |
| 4,423,287 A | 12/1983 | Zeidler |
| 4,528,442 A | 7/1985 | Endo |
| 4,536,647 A | 8/1985 | Atalla et al. |
| 4,817,957 A * | 4/1989 | Reeves .............. A63F 3/00097 273/248 |
| 5,254,843 A | 10/1993 | Hynes et al. |
| 5,311,594 A | 5/1994 | Penzias |
| 5,434,398 A | 7/1995 | Goldberg |
| 5,465,387 A | 11/1995 | Mukherjee |
| 5,513,250 A | 4/1996 | Mcallister |
| 5,592,611 A | 1/1997 | Midgely et al. |
| 5,625,689 A | 4/1997 | Indeck et al. |
| 5,627,355 A | 5/1997 | Rahman et al. |
| 5,633,930 A | 5/1997 | Davis et al. |
| 5,708,422 A | 1/1998 | Blonder et al. |
| 5,740,244 A | 4/1998 | Indeck et al. |
| 5,745,576 A | 4/1998 | Abraham et al. |
| 5,774,525 A | 6/1998 | Kanevsky et al. |
| 5,819,226 A | 10/1998 | Gopinathan et al. |
| 5,825,884 A | 10/1998 | Zdepski et al. |
| 5,834,747 A | 11/1998 | Cooper |
| 5,839,119 A | 11/1998 | Krsul et al. |
| 5,872,834 A | 2/1999 | Teitelbaum |
| 5,878,337 A | 3/1999 | Joao et al. |
| 5,892,211 A * | 4/1999 | Davis .................. G06Q 20/341 235/380 |
| 5,903,830 A | 5/1999 | Joao et al. |
| 5,914,472 A | 6/1999 | Foladare et al. |
| 5,920,628 A | 7/1999 | Indeck et al. |
| 5,988,497 A | 11/1999 | Wallace |
| 6,005,942 A | 12/1999 | Chan et al. |
| 6,012,144 A | 1/2000 | Pickett |
| 6,029,154 A | 2/2000 | Pettitt |
| 6,105,008 A * | 8/2000 | Davis .................. G06Q 20/02 235/375 |
| 6,157,707 A | 12/2000 | Baulier et al. |
| 6,219,692 B1 | 4/2001 | Stiles |
| 6,219,793 B1 | 4/2001 | Li et al. |
| 6,223,209 B1 | 4/2001 | Watson |
| 6,260,146 B1 | 7/2001 | Mos et al. |
| 6,282,656 B1 | 8/2001 | Wang |
| 6,298,336 B1 | 10/2001 | Davis et al. |
| 6,298,373 B1 | 10/2001 | Burns et al. |
| 6,308,890 B1 | 10/2001 | Cooper |
| 6,367,011 B1 | 4/2002 | Lee et al. |
| 6,370,580 B2 | 4/2002 | Kriegsman |
| 6,442,532 B1 | 8/2002 | Kawan |
| 6,529,725 B1 | 3/2003 | Joao et al. |
| 6,611,913 B1 * | 8/2003 | Carroll ................. H04L 9/3273 713/171 |
| 6,612,488 B2 | 9/2003 | Suzuki |
| 6,714,918 B2 | 3/2004 | Hillmer et al. |
| 6,830,183 B2 | 12/2004 | Von Mueller et al. |
| 6,832,721 B2 | 12/2004 | Fujii |
| 6,848,050 B1 | 1/2005 | Merman et al. |
| 6,899,269 B1 | 5/2005 | Deland |
| 6,913,194 B2 | 7/2005 | Suzuki |
| 6,944,782 B2 | 9/2005 | Von Mueller et al. |
| 6,999,449 B2 | 2/2006 | Barna et al. |
| 7,003,497 B2 | 2/2006 | Maes |
| 7,007,840 B2 | 3/2006 | Davis |
| 7,024,396 B2 | 4/2006 | Woodward |
| 7,044,394 B2 | 5/2006 | Brown |
| 7,051,002 B2 | 5/2006 | Keresman et al. |
| 7,096,003 B2 | 8/2006 | Joao et al. |
| 7,143,095 B2 | 11/2006 | Barrett et al. |
| 7,146,009 B2 | 12/2006 | Andivahis et al. |
| 7,181,017 B1 * | 2/2007 | Nagel .................. H04L 9/0825 380/282 |
| 7,243,366 B2 | 7/2007 | Medvinsky et al. |
| 7,793,103 B2 | 9/2010 | Fu et al. |
| 7,831,519 B2 | 11/2010 | Kean |
| 8,494,968 B2 | 7/2013 | Hammad et al. |
| 2002/0049908 A1 | 4/2002 | Shimosato et al. |
| 2002/0062440 A1 | 5/2002 | Akama |
| 2002/0091562 A1 | 7/2002 | Siegel et al. |
| 2002/0108062 A1 | 8/2002 | Nakajima et al. |
| 2002/0133462 A1 | 9/2002 | Shteyn |
| 2003/0046534 A1 | 3/2003 | Alldredge |
| 2003/0105964 A1 | 6/2003 | Brainard et al. |
| 2003/0110372 A1 | 6/2003 | Proudler |
| 2003/0147536 A1 * | 8/2003 | Andivahis ............... H04L 9/083 380/277 |
| 2003/0158960 A1 * | 8/2003 | Engberg .................. G06Q 20/02 709/237 |
| 2003/0177401 A1 * | 9/2003 | Arnold ................. H04L 9/0866 713/155 |
| 2003/0185395 A1 | 10/2003 | Lee et al. |
| 2003/0208684 A1 | 11/2003 | Camacho et al. |
| 2004/0019564 A1 | 1/2004 | Goldthwaite et al. |
| 2004/0107170 A1 | 6/2004 | Labrou et al. |
| 2004/0171406 A1 | 9/2004 | Purk |
| 2004/0185830 A1 | 9/2004 | Joao et al. |
| 2004/0187012 A1 * | 9/2004 | Kohiyama ........... G06F 21/6218 713/193 |
| 2005/0080730 A1 | 4/2005 | Sorrentino |
| 2005/0097365 A1 * | 5/2005 | Alldredge .......... G06Q 20/3823 726/4 |
| 2005/0102523 A1 | 5/2005 | Harrison et al. |
| 2005/0137986 A1 | 6/2005 | Kean |
| 2005/0170814 A1 | 8/2005 | Joao et al. |
| 2005/0182735 A1 | 8/2005 | Zager et al. |
| 2005/0209975 A1 | 9/2005 | So et al. |
| 2006/0040726 A1 * | 2/2006 | Szrek ................... G06Q 20/341 463/17 |
| 2006/0049256 A1 | 3/2006 | Von Mueller et al. |
| 2006/0059110 A1 | 3/2006 | Madhok et al. |
| 2006/0173794 A1 * | 8/2006 | Sellars ............. G06Q 20/38215 705/76 |
| 2006/0202025 A1 | 9/2006 | Calabrese et al. |
| 2006/0219776 A1 | 10/2006 | Finn |
| 2006/0281439 A1 | 12/2006 | Benco et al. |
| 2006/0282382 A1 | 12/2006 | Balasubramanian et al. |
| 2007/0276765 A1 * | 11/2007 | Hazel .................. G06K 7/082 705/71 |
| 2008/0004121 A1 | 1/2008 | Gatto et al. |
| 2008/0005037 A1 | 1/2008 | Hammad et al. |
| 2008/0022089 A1 | 1/2008 | Leedom |
| 2008/0029593 A1 | 2/2008 | Hammad et al. |
| 2008/0034221 A1 | 2/2008 | Hammad et al. |
| 2008/0040271 A1 | 2/2008 | Hammad et al. |
| 2008/0040276 A1 | 2/2008 | Hammad et al. |

(56) References Cited

U.S. PATENT DOCUMENTS

| | | | |
|---|---|---|---|
| 2008/0103982 A1 | 5/2008 | Hammad et al. | |
| 2008/0189214 A1 | 8/2008 | Mueller et al. | |
| 2008/0208697 A1 | 8/2008 | Kargman et al. | |
| 2009/0043681 A1* | 2/2009 | Shoji | G06Q 40/00 705/35 |
| 2009/0144203 A1 | 6/2009 | Hurry | |
| 2009/0261162 A1 | 10/2009 | Kargman et al. | |
| 2009/0321517 A1* | 12/2009 | Deane | G07C 9/20 235/382 |
| 2010/0121701 A1 | 5/2010 | Nguyen et al. | |
| 2010/0153273 A1 | 6/2010 | Sellars et al. | |
| 2010/0169223 A1 | 7/2010 | Yuan | |
| 2010/0299265 A1 | 11/2010 | Walters et al. | |
| 2013/0275310 A1 | 10/2013 | Hammad et al. | |

OTHER PUBLICATIONS

SET Secure Electronic Transaction Specification. Book 1: Business Description. Version 1.0. May 31, 1997.*
"Coroner Accused of Trading Bodies for Lab Space. MSNBC", Online Available at http://www.msnbc.msn.com/cleanprint/CleanPrintProxy.aspx1299528847121, Jan. 20, 2006, 3 pages.
"SET Secure Electronic Transaction Specification", Book 1: Business Description. Version 1.0, May 31, 1997, 80 pages.
U.S. Appl. No. 11/764,351 , "Final Office Action", dated Apr. 1, 2011, 32 pages.
U.S. Appl. No. 11/764,351 , "Non-Final Office Action", dated Jul. 20, 2010, 20 pages.
U.S. Appl. No. 11/764,351 , "Non-Final Office Action", dated Jun. 27, 2012, 7 pages.
U.S. Appl. No. 11/764,351 , "Notice of Allowance", dated Mar. 7, 2013, 7 pages.
U.S. Appl. No. 11/764,351 , "Restriction Requirement", dated May 26, 2010, 7 pages.
U.S. Appl. No. 11/764,351 , "Supplemental Notice of Allowability", dated Jul. 1, 2013, 5 pages.
U.S. Appl. No. 13/912,120 , "Final Office Action", dated Jul. 27, 2017, 12 pages.
U.S. Appl. No. 13/912,120 , "Non-Final Office Action", dated Feb. 19, 2016, 11 pages.
U.S. Appl. No. 13/912,120 , "Notice of Allowance", dated Jul. 6, 2018, 11 pages.
U.S. Appl. No. 13/912,120 , "Restriction Requirement", dated Oct. 30, 2015, 6 pages.
Derfler et al., "How Networks Work, Millennium Edition", Que Publishing, Front and back matter, Chapters 1-27, 2000, 228 pages.
Kerman , "Importing Graphics Into Flash", Online Available at http://www.informit.com/articles/printerfriendly.aspxp=170278, Apr. 30, 2004, pp. 1-11.
Menezes et al., "Handbook of Applied Cryptography", CRC Press, 1996, Chapters 7 and 12 included, Online Available at http://www.cacr.math.uwaterloo.ca/hac, 1996, 114 pages.
Menezes et al., "Handbook of Applied Cryptography", CRC Press, Chapters 1, 3, 8, 10, 13 included, Online Available at http://www.cacr.math.uwaterloo.ca/hac, 1996, 221 pages.
PCT/US2007/071386 , "International Preliminary Report on Patentability", dated Jul. 29, 2013, 3 pages.
PCT/US2007/071386 , "International Search Report and Written Opinion", dated Aug. 5, 2008, 4 pages.
Sloman , "Network and Distributed Systems Management", Addison Wesley, ISBN 0-201-62745-0, Front matter, 1994, 27 pages.

\* cited by examiner

TERMINAL DATA ENCRYPTION

CROSS-REFERENCES TO RELATED APPLICATIONS

This application is a continuation of U.S. patent application Ser. No. 11/764,351, filed on Jun. 18, 2007, which is a non-provisional patent application of and claims the benefit of: U.S. Provisional Patent Application No. 60/815,059 filed on Jun. 19, 2006, U.S. Provisional Patent Application No. 60/815,430 filed on Jun. 20, 2006, and U.S. Provisional Patent Application No. 60/884,089 filed on Jan. 9, 2007. All of these prior applications are herein incorporated by reference in their entirety for all purposes.

BACKGROUND

In the payment industry, magnetic stripe cards currently have track data elements stored in data tracks (e.g., track 1 or track 2). Examples of track data elements include the cardholder's PAN (personal account number), CVV (card verification value), etc.

In a typical purchase transaction using a magnetic stripe card, a card is swiped at a point of sale terminal and data on the card are read by the point of sale terminal. The point of sale terminal then sends the data to the issuer of the card in an authorization request message. The authorization request message requests authorization from the issuer to proceed with the transaction. The issuer then receives the authorization request message and then approves or declines the request. An authorization response message including the approval or decline is then sent from the issuer back to the point of sale terminal to inform the merchant as to whether or not the transaction has been approved or declined.

There is a need to protect data as it is delivered from the point of sale terminal to the issuer. If the data passing between the point of sale terminal and the issuer is intercepted by an unauthorized person, the unauthorized person could conduct unauthorized financial transactions using the transaction data.

One way to provide greater security is to encrypt transaction data before it is sent from the point of sale terminal to the issuer. For example, in a conventional PIN (personal identification number) based transaction using a payment card, symmetric keys can be used to encrypt and decrypt a cardholder's PIN as it passes from the point of sale terminal to the issuer. To encrypt the PIN at the point of sale terminal, a symmetric key can be stored in a tamper-resistant HSM (hardware security module) coupled to a point of sale terminal. HSMs are usually in the form of a plug-in card (PCI) or external device. A corresponding symmetric key may be stored at the issuer and the issuer may use the corresponding symmetric key to decrypt the encrypted PIN.

While such conventional methods of encryption are effective for encrypting PINs, a number of improvements could be made. For example, although HSM modules can be used to encrypt PINs, they typically are specialized and expensive. A specialized terminal may cost on the order of $300-$600 in today's dollars. It would be desirable to provide for a security process which could use an HSM module, but does not require one.

In addition to cost and complexity, key management processes in conventional encryption processes could also be improved. For example, in conventional key management processes, key updates can be sent from the issuer or other entity to a POS terminal every hour or once per day. This can be a burdensome and expensive task as there can be thousands of POS terminals that need to be updated in a regular manner.

It is more difficult for an issuer or other party to send a symmetric key to a point of sale terminal, than it is to receive it. Point of sale terminals are constantly being installed, updated, modified, and removed, and an issuer (or other party who wants to receive encrypted transaction data) cannot know when all point of sale terminals are available to communicate with the issuer. For example, after a POS terminal is installed, it needs to notify an issuer that it exists. Once the issuer is notified, it can then send a symmetric key to the POS terminal. This process requires two-way communication between the issuer and the terminal in order to install symmetric keys. This two-way communication process increases the processing burden to any payment processing system, especially since there may be thousands of POS terminals being installed on a regular basis.

To improve the security of financial messages passing through a network, some have suggested generating transaction specific keys in a point of sale terminal and then sending the keys from the point of sale terminal to a remotely located controller along with transaction request messages for various transactions. While this may be an effective security process, sending a separate key for every transaction can also burden existing payment processing systems. It would also require POS terminals and issuers to maintain and use complex and expensive hardware and software.

Embodiments of the invention address these problems and other problems, individually and collectively.

BRIEF SUMMARY

Embodiments of the invention are directed to methods, systems, and computer readable media for allowing financial transactions to be conducted in a secure manner.

One embodiment of the invention is directed to a method comprising generating an initial key after interacting with an access device, storing the initial key at a key storage location, altering the initial key with a public key to form an altered key, and sending the altered key to a server computer along with an identifier for the access device. The altered key is changed to the initial key at the server computer and is stored with the identifier in a database in operative communication with the server computer. The initial keys that are stored at the key storage location and in the database are used to alter and restore transaction data associated with multiple financial transactions that are conducted using the access device.

Another embodiment of the invention is directed to a method comprising receiving an altered key and an identifier associated with an access device, wherein the altered key was generated from an initial key after an interaction with the access device. The altered key is changed back to the initial key, and is stored in a database. The initial key is then used to restore altered transaction data received from the access device.

Another embodiment of the invention is directed to a method comprising identifying a track data element located at a first data location in a data track to encrypt, altering the track data element, placing the altered track data element in a second data location that is different from the first data location, and sending the altered track data element in the second data location to an issuer.

Another embodiment of the invention is directed to a method comprising identifying a track data element located at a first data location in a data track, concatenating the track data element and a terminal identifier to form a data string, altering the data string; and inserting values from the data string into the first data location. The track data element may comprise a CVV and the first data location may comprise a CVV data field.

Other embodiments of the invention are directed to computer readable media comprising code for performing the above-described methods as well as systems, apparatuses and devices that perform the methods and/or that use the computer readable media.

These and other embodiments of the invention are described in further detail below.

DETAILED DESCRIPTION

Figure 1:
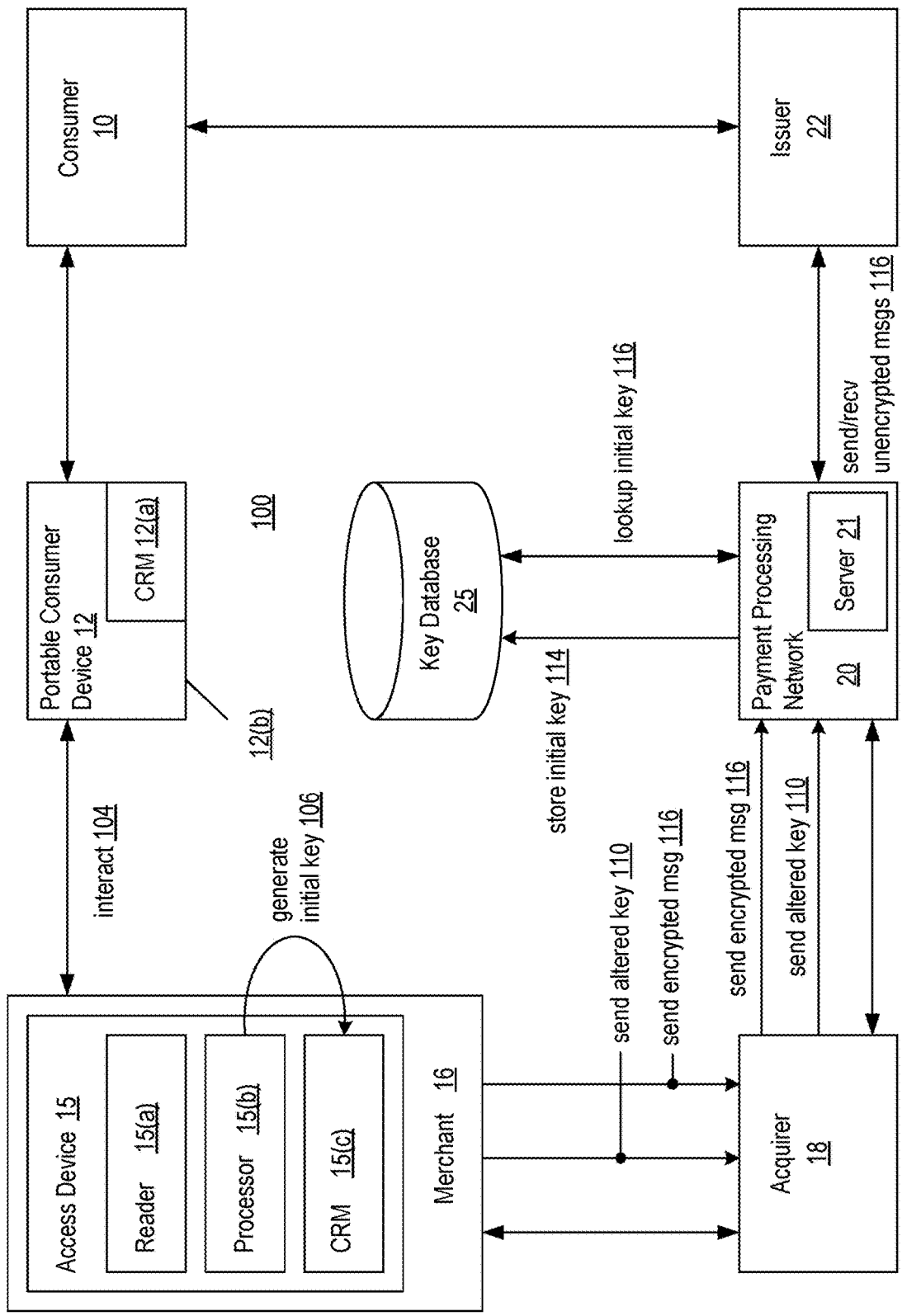
FIG. 1 shows a block diagram of a system according to an embodiment of the invention.

One embodiment of the invention is directed to a method for providing a key to one end of a financial transaction and another key to another end of the financial transaction. In preferred embodiments, an access device (e.g., a POS terminal) or the like generates an initial key, and then stores it. In a specific example, an initial key, such as a terminal-specific symmetric key, is generated using a secure element (e.g., a secure chip) that is associated with a point of sale terminal. The secure element may generate the initial key after one interacts (e.g., swipes a card through a POS terminal) with the access device. Once generated, the terminal-specific symmetric key is altered (e.g., encrypted) with a public key and the altered, terminal-specific symmetric key is sent to the issuer along with a terminal identifier (e.g., a terminal ID number). Before (or after) it arrives at the issuer, a server computer may receive and change (e.g., decrypt) the altered, terminal-specific symmetric key back to the originally generated initial key. The server computer may then store the initial key in a key database along with a corresponding terminal identifier.

Once the terminal-specific initial key and the terminal identifier are stored in the database, the server computer may use the terminal-specific symmetric initial key to decrypt transaction data for multiple financial transactions (e.g., payment transactions, money transfers, etc.) conducted using the point of sale terminal. In some embodiments, once decrypted, the transaction data (which may include track data elements such as a PAN, transaction amounts, etc.) can be sent to the various issuers who can approve or disapprove of the financial transactions. Various specific methods for securely passing financial transaction data are also described in detail below.

As explained in further detail below, an initial key is altered at an access device or other front end transaction location, and the altered key is sent to a back end transaction location such as a remotely located server computer. At the server computer, the altered key is changed back to the initial key. In preferred embodiments, the alteration process preferably uses encryption, and any suitable pre-existing encryption processes may be used in embodiments of the invention. Symmetric or secret-key processes include: digital encryption standard (DES), triple DES, and advanced encryption standard (AES). A well known public key encryption technique is ECC (elliptical curve cryptography). Other encryption techniques can be used as well.

Embodiments of the invention have a number of advantages. In embodiments of the invention, an initial, terminal-specific key can be generated at a terminal and then sent to a remotely located server computer, and it can thereafter be used to decrypt transaction data. The encryption of such transaction information can allow for the secure passage of transaction data from one end of a financial transaction to another end of the financial transaction. The encryption of such information may also allow an entity such as a payment processing organization or issuer to authenticate a portable consumer device that is being used at an access device. Embodiments of the invention can also be used with PANs of different lengths (e.g., 13, 16, and 19 digits).

In comparison to conventional encryption systems, embodiments of the invention can transmit a terminal-specific initial key once to a server computer at a remote location. A back and forth process of terminal identification and subsequent key shipment to the terminal is not needed. In addition, a separate key is not required for every transaction that is conducted. Consequently, complex hardware and software are not required in embodiments of the invention.

I. Payment Processing Systems

FIG. 1 shows a system 100 that can be used in an embodiment of the invention. For simplicity of illustration, one merchant, one issuer, one acquirer, one access device, and one consumer are shown. It is understood, however, that embodiments of the invention may include multiple merchants, acquirers, access devices, and/or consumers. In addition, some embodiments of the invention may include fewer than all of the components shown in FIG. 1.

The system 100 includes a merchant 16 and an acquirer 18 associated with the merchant 16. In a typical payment transaction, a consumer 10 may purchase goods or services at the merchant 16 using a portable consumer device 12. The acquirer 18 can communicate with an issuer 22 via a payment processing network 20.

The acquirer 18 is typically a bank that has a merchant account. The issuer 22 may also be a bank, but could also be business entity such as a retail store. Some entities are both acquirers and issuers, and embodiments of the invention include such entities.

The consumer 10 may be an individual, or an organization such as a business that is capable of purchasing goods or services.

The portable consumer device 12 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

As shown in FIG. 1, the portable consumer device 12 may comprise a computer readable medium 12(*a*) and a body 12(*b*). The computer readable medium 12(*a*) may be on the body 12(b), which may be in the form a plastic substrate, housing, or other structure. The computer readable medium 12(a) may be a memory that stores data and may be in any suitable form. Exemplary computer readable media 12(a) may be in any suitable form including a magnetic stripe, a memory chip, etc. If the portable consumer device 12 is in the form of a card, it may have an embossed region which is embossed with the primary PAN.

The payment processing network 20 is located between (in an operational sense) the acquirer 18 and the issuer 22. It may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 26 may use any suitable wired or wireless network, including the Internet.

The payment processing network 20 may include a server computer 21. A server computer is typically a powerful computer or cluster of computers. For example, the server computer can be a large mainframe, a minicomputer cluster, or a group of servers functioning as a unit. In one example, the server computer may be a database server coupled to a Web server.

The server computer 21 may comprise a computer readable medium comprising code for receiving an altered key and an identifier associated with an access device, wherein the altered key was generated from an initial key after an interaction with the access device, code for changing the altered key back to the initial key, code for storing the initial key in a database, and code for using the initial key to restore transaction data associated with multiple financial transactions conducted using the access device.

A key database 25, which may be operated by or within the payment processing network 20 may be in operative communication with the server computer 21. The key database 25 may store terminal specific keys generated by the access device 15. It may also store corresponding terminal specific identifiers (e.g., terminal IDs, merchant IDs, etc.) so that appropriate keys can be retrieved by the server computer 20 when transaction data from various access devices need to be decrypted. Other information that can be stored in the database 25 may include an acquirer BIN, and a merchant ID.

The merchant 16 may also have an access device 15 that can interact with the portable consumer device 32. Alternatively, the access device 15 could be a kiosk or a personal computer and need not be located at the merchant 16, but could be associated with the merchant 16. Thus, in embodiments of the invention, the access device 15 could be located at any other suitable location.

The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

The access device 15 may comprise a reader 15(a), a processor 15(b) and a computer readable medium 15(c). The reader 15(a) may include any suitable contact or contactless mode of operation. For example, exemplary card readers can include RF (radio frequency) antennas, magnetic stripe readers, etc. to interact with the portable consumer device 12. The processor 15(b) may comprise one or more microprocessors. The computer readable medium 15(c) may comprise any suitable combination of memory devices that store computer code which is executable by the processor. The access device 15 could also comprise an output device (not shown) such as a display screen or a printer. The output device can output data such as transaction amounts, authorization codes, etc.

The computer readable medium 15(c) may comprise code for generating an initial key after interacting with an access device, code for storing the initial key at a key storage location (e.g., within the computer readable medium 15(c) in the access device 15), code for altering the initial key with a public key to form an altered key, and code for sending the altered key to the server computer 21 along with an identifier for the access device.

In a typical purchase transaction, the consumer 10 purchases a good or service at the merchant 16 using a portable consumer device 12 such as a credit card. The consumer's portable consumer device 12 can interact with an access device 15 such as a POS (point of sale) terminal at the merchant 16. For example, the consumer 10 may take a credit card and may swipe it through an appropriate slot in the POS terminal. Alternatively, the POS terminal may be a contactless reader, and the portable consumer device 12 may be a contactless device such as a contactless card.

An authorization request message is then forwarded to the acquirer 18. After receiving the authorization request message, the authorization request message is then sent to the payment processing network 20. The payment processing network 20 then forwards the authorization request message to the issuer 22 of the portable consumer device 12.

After the issuer 22 receives the authorization request message, the issuer 22 sends an authorization response message back to the payment processing network 20 to indicate whether or not the current transaction is authorized (or not authorized). The transaction processing network 20 then forwards the authorization response message back to the acquirer 18. The acquirer 18 then sends the response message back to the merchant 16.

After the merchant 16 receives the authorization response message, the access device 15 at the merchant 16 may then provide the authorization response message for the consumer 10. The response message may be displayed by the access device 15, or may be printed out on a receipt.

At the end of the day, a normal clearing and settlement process can be conducted by the transaction processing network 20. A clearing process is a process of exchanging financial details between and acquirer and an issuer to facilitate posting to a consumer's account and reconciliation of the consumer's settlement position.

In the above example, activities occurring at the access device 15, or the merchant 16 may be part of "front end" operations in a financial transaction, whereas activities that occur at the payment processing network 20 or the issuer 22 may be part of "back end" operations.

Figure 2:
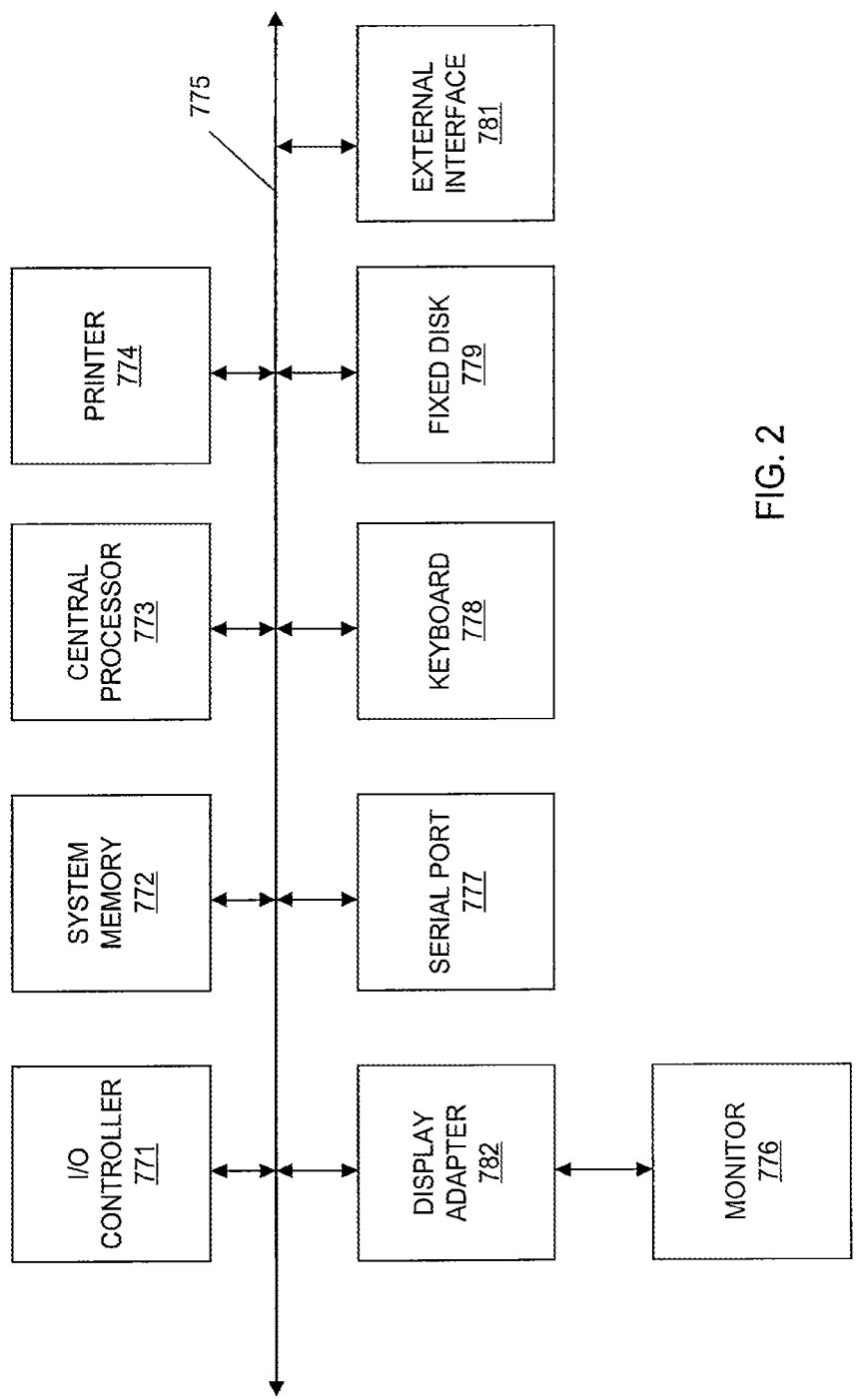
FIG. 2 shows components of a computer apparatus.

FIG. 2 shows typical components or subsystems of a computer apparatus. Such components or any subset of such components may be present in the server computer 21, access device 15, or any computer operated by the merchant 16, acquirer 18, payment processing network 20, or issuer 22. The subsystems shown in FIG. 2 are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

II. Key Generation and Storage Processes

Figure 3:
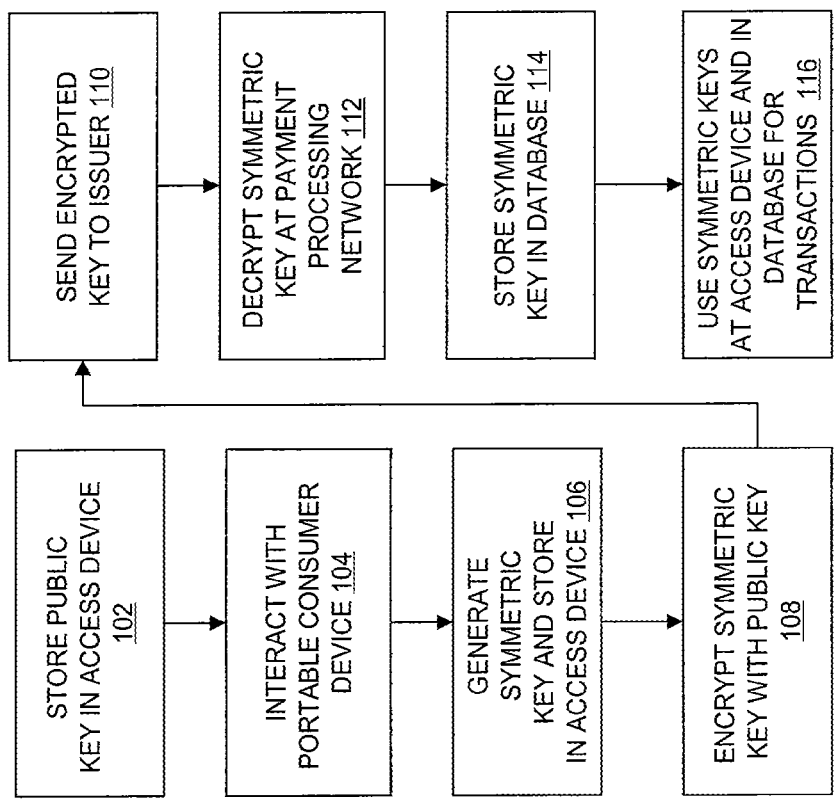
FIG. 3 shows a flowchart illustrating a method for providing a key to a server computer.

Embodiments of the invention include key generation and storage processes that are efficient and effective. Keys can be generated and then used at opposite ends of a financial transaction to ensure the secure passage of information between the two ends. Exemplary key generation and storage processes can be described with reference to the flowchart in FIG. 3 and the system block diagram shown in FIG. 1.

First, a public key may be stored in the reader 15(a) which is in the access device 15 (step 102). The reader 15(a) may include a secure element (e.g., a secure chip comprising memory) that stores the public key. The public key may be sent to the reader 15(a) by a party such as a payment processing organization after the access device 15 has been installed, and may then be stored therein. Alternatively, the reader 15(a) may have been manufactured with a memory comprising the public key and the public key be present in the access device 15 upon installation.

At some point in time, one may interact with the access device 15 to cause the access device 15 generate a terminal-specific symmetric key. For example, the portable consumer device 12 can be used to interact with the access device 15 (step 104). The interaction with the access device 15 can be the first time that the access device 15 communicates with the server computer 21. In some embodiments, this first interaction with the access device 15 and the first interaction between the access device 15 and the server computer 21 can be characterized as an "initialization transaction." An initialization transaction can be different than a typical payment transaction, in that the special initialization transaction initially identifies the terminal to a remote server computer 21.

During the initialization transaction, a symmetric key can be generated by the secure element in the reader 15(a) and can be stored in the computer readable medium 15(c) (step 106). The place where the symmetric key is stored may be referred to as a key storage location. It is typically in the access device 15, but could be present at some other location proximate to or affiliated with the merchant 16 in other embodiments.

The generated symmetric key is then encrypted with the public key (step 108). The generated symmetric key may be encrypted at the access device 15 or at any other suitable device at any other suitable front end location.

Although the public key is preferably stored in the access device 15 and the symmetric key is generated by the access device 15 in this example, in other embodiments, the public key may be stored and the symmetric key may be generated in any other suitable location accessible to the reader 15(a). For example, the public key could be stored in a back end host computer (not shown), which is coupled to the access device 15 and is operated by the merchant 16. The back end host computer could also generate the symmetric key and encrypt the symmetric key. In this example, the symmetric key that is generated at the front end could be a "merchant-specific key" and could be associated with one or more merchant terminals instead of a "terminal-specific key" which is associated with only one terminal.

The encrypted, terminal-specific symmetric key is sent from the access device 15 to the issuer 22, via the acquirer 18 and the payment processing network 20 (step 110). A terminal identifier such as a terminal ID number, merchant ID number, or the like can also be sent from the access device 15 to the payment processing network 20.

Before the symmetric key arrives at the issuer 22, however, the server computer 21 operated by an intermediate payment processing network 20 may receive and then decrypt the encrypted, terminal-specific symmetric key (step 112). After the received encrypted terminal-specific key is decrypted, the server computer 21 may store the restored initial terminal-specific symmetric key in the key database 25 (step 114) along with the terminal identifier. Various terminal-specific symmetric keys and their corresponding terminal identifiers may be stored in a lookup table of the like in the key database 25.

After the restored, initial terminal-specific key is stored in the key database 25, it may be subsequently retrieved by the server computer 21 and then used to restore (e.g., decrypt) previously altered transaction data for multiple financial transactions (e.g., payment transactions) using different portable consumer devices interacting with the access device 15 (step 116). For example, each time an authorization request message is sent from the access device 15 to the issuer 22, any portion of it can be encrypted with the symmetric key stored in the access device 15 and then decrypted with the corresponding symmetric key stored in the key database 25. After decrypting, the decrypted authorization request message may then be sent to the issuer 22 in the format that the issuer 22 normally expects to receive the authorization request message.

Since the intermediate server computer 21 and the key database 25 are operationally between the issuer 22 and the access device 15, they can be used to decrypt authorization request messages from numerous different access devices at numerous different merchants. The decrypted messages may then be sent to numerous different issuers. In addition, providing the server computer 21 between the issuer 22 and the access device 15 is desirable, since terminal-specific keys can be maintained in one or a small number of locations. This architecture is simple and efficient, and ensures the secure passage of transaction data between the access device 15 and the server computer 21.

In other embodiments, each issuer 22 could maintain a separate key database. Requiring each issuer 22 to maintain a terminal-specific key database would improve security between the access device 15 and each issuer 22. It would, however, also increase the overall memory storage requirements of the payment processing system 100.

III. Transaction Data Alteration Processes

Once corresponding symmetric keys have been stored in the access device 15 and the key database 25, transaction data can be altered in various ways to further enhance the security of transaction data transmitted in a payment processing system. Various transaction data alteration processes according to embodiments of the invention can be described with reference to the flowcharts in FIGS. 4-8 and the system block diagram in FIG. 1. As noted below, some data alteration processes use keys and some need not use keys.

Figure 4:
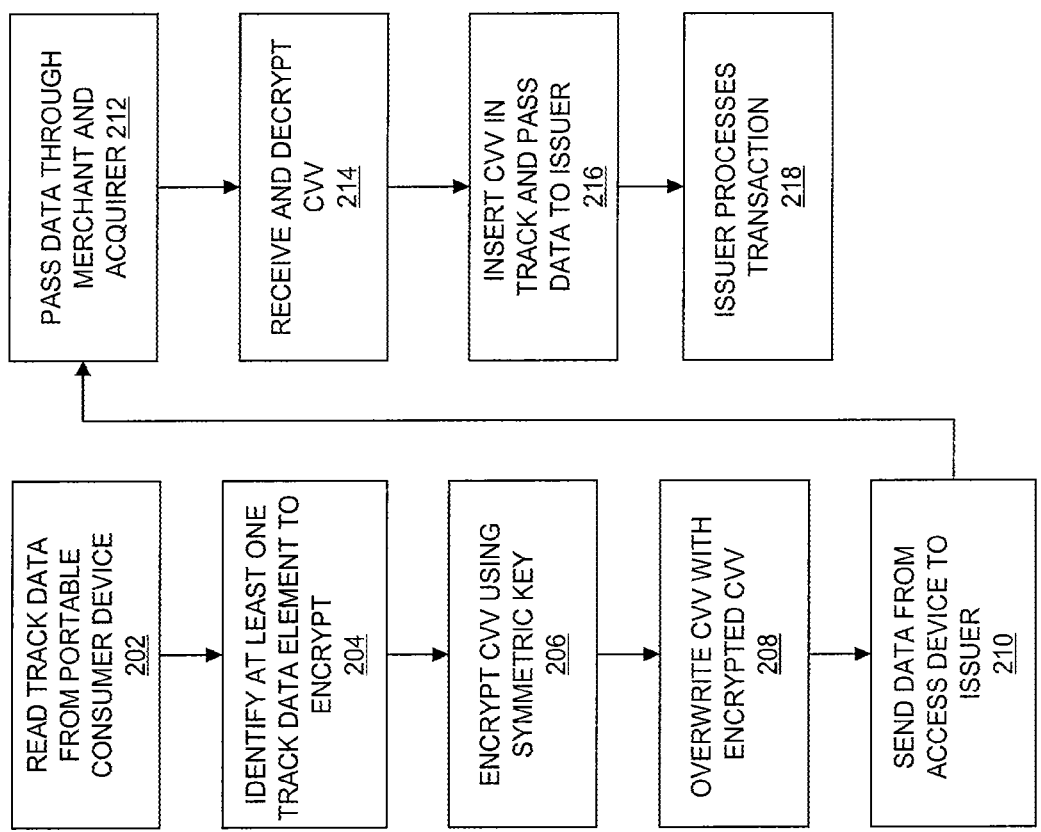
FIGS. 4-8 show flowcharts illustrating secure methods for delivering transaction data from an access device to an issuer.

FIG. 4 illustrates a process for encrypting a track data element such as a CVV and then inserting the encrypted CVV in the data location where the CVV normally resides (e.g., the CVV or discretionary data field in track 1 or track 2). Referring to FIG. 4 and FIG. 1, track data are read from a portable consumer device 12 (step 202). The track data may comprise data in track 1, 2, or 3.

There are up to three tracks on magnetic cards used for financial transactions, known as tracks 1, 2, and 3. Track 3 is currently virtually unused by the major worldwide networks such as Visa. Point-of-sale card readers almost always read track 1, or track 2, and sometimes both, in case one track is unreadable. The minimum cardholder account information needed to complete a transaction is present on both tracks. Track 1 has a higher bit density (210 bits per inch vs. 75), is the only track that may contain alphabetic text, and hence is the only track that contains the cardholder's name.

The access device 15 then identifies at least one track data element to encrypt (step 204). Typical data elements on track one include: primary account number—up to 19 characters; name—two to 26 characters; service code—three characters; discretionary data (e.g., may include Pin Verification Key Indicator (PVKI, 1 character), Pin Verification Value (PVV, 4 characters), and Card Verification Value or Card Verification Code (CVV or CVK, 3 characters). Typical data elements in track 2 include primary account number—up to 19 characters; expiration date—four characters; service code—three characters; and discretionary data—as in track one. Any of these data elements, other data elements, or combinations thereof may be encrypted by the access device 15.

In preferred embodiments, the access device 15 encrypts a track data element such as a CVV value using a symmetric key (step 206). The CVV is particularly desirable to encrypt. If the CVV is altered, track data may be sent through an existing payment processing system without changing the existing payment processing system.

The access device 15 then overwrites the CVV in the data track with the encrypted CVV (step 208). The encrypted CVV value can be placed in the data track location where the unaltered CVV value would normally be present.

The encrypted CVV and other transaction data (e.g., amount of the purchase, PAN, etc.) are sent from the access device 15 to the issuer 22 (step 210). As they are sent to the issuer 22, the transaction data then pass through the merchant 16 and the acquirer 18 (step 212).

The encrypted CVV is then received and decrypted by the server computer 21 at the payment processing network 20 (step 214). The server computer 21 determines that the received transaction data came from the access device 15 by using a terminal identifier or the like. After the access device 15 is identified, the appropriate symmetric key is retrieved from the key database 25, and the key is used to change or restore the previously encrypted CVV key to its original form. The server computer 21 then inserts the unencrypted CVV into the location that previously stored the encrypted CVV, and then passes the transaction data including the unencrypted CVV to the issuer 22 (step 216).

The issuer 22 then processes the transaction as described above (step 218). That is, the authorization request message is reviewed to determine if the consumer is authorized to conduct the transaction. The issuer 22 then approves or declines the request, and an authorization response message is sent back to the access device 15 as described above.

Figure 5:
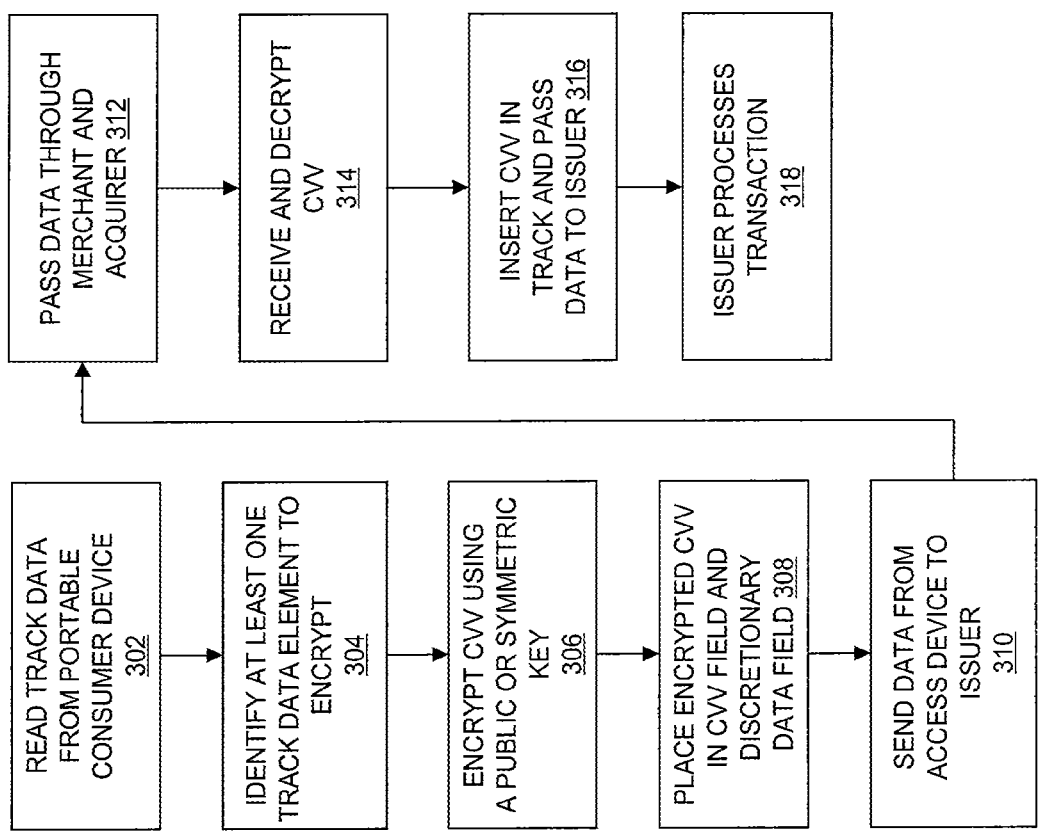

FIG. 5 shows another embodiment of the invention. In this example, an altered track data element is placed in a data location other than the data location where the original track data element resided. In addition, in this example, a public or private key may be used to alter data.

Referring to FIG. 5 and FIG. 1, track data are read from a portable consumer device 12 (step 302). The access device 15 then identifies at least one track data element to encrypt (step 304). The access device 15 then encrypts a track data element such as a CVV value using a symmetric or public key (step 306). Steps 302, 304, and 306 can be similar to steps 202, 204, and 206 described above.

The access device 15 then overwrites the CVV with the encrypted CVV. It may also insert the encrypted CVV in a data location other than where the original CVV was obtained. An example of another location is a discretionary data field or field 55 (step 308). Field 55 can include up to 32 bytes of data.

The transaction data including the encrypted CVV that is located in the CVV field and the discretionary data field are sent from the access device 15 to the issuer 22 (step 310). The transaction data then pass through the merchant 16 and the acquirer 18 (step 312).

The transaction data including the encrypted CVV that is located in the CVV field and the discretionary data field are then received and decrypted by the server computer 21 at the payment processing network 20 (step 314). A public or symmetric key, as appropriate, may be used to decrypt the encrypted CVVs.

The server computer 21 determines that the received transaction data came from the access device 15 by using a terminal identifier or merchant identification value. After the access device 15 is identified, the appropriate key is retrieved from the key database 25. The server computer 21 then decrypts the encrypted CVVs in the CVV field and the discretionary data field, and then inserts the unencrypted CVV into the normal CVV data field, and then passes the transaction data including the unencrypted CVV to the issuer 22 (step 316).

The issuer 22 then processes the transaction as described above (step 318). That is, the authorization request message is reviewed to determine if the consumer is authorized to conduct the transaction. The issuer 22 then approves or declines the request, and an authorization response message is sent back to the access device 15 as described above.

Figure 6:
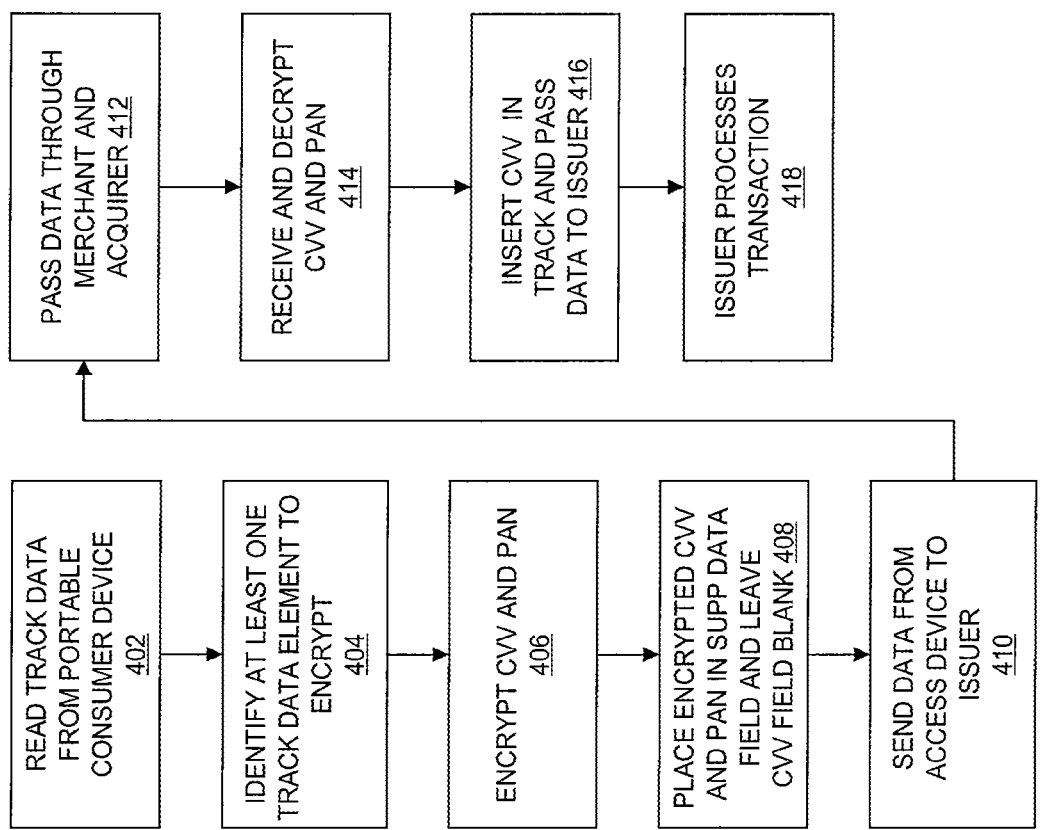

FIG. 6 shows another embodiment of the invention where a data element for alteration is identified. The data element is then altered and is then moved to a location other than the location where the data element normally resides. The location where the data element normally resides is left blank. Moving altered track element data to another location allows for more flexibility, since other locations may not have the same data storage limitations that are present in track 1 or track 2. In addition, in the embodiment in FIG. 6, at least two track data elements can be combined, relocated, and then altered (encrypted). This further improves the security of embodiments of the invention.

A method according to an embodiment of the invention comprises identifying a track data element located at a first data location (e.g., a first data field) in a data track to encrypt, altering the track data element, placing the altered track data element in a second data location (e.g., a second data field) that is different from the first data location, and sending the altered track data element in the second data location to an issuer.

Referring to FIG. 6 and FIG. 1, track data are read from a portable consumer device 12 (step 402). The access device 15 then identifies at least one track data element to encrypt (step 404). The access device 15 then encrypts track data elements such as a CVV and PAN value using a symmetric or public key (step 406). The CVV and PAN may or may not be concatenated. Steps 402, 404, and 406 can be similar to steps 202, 204, and 206 described above.

The access device 15 then encrypts the CVV and PAN places them in a data location other than where the original CVV and PAN were obtained, and the original data location for the CVV (i.e., the CVV and PAN data fields) is left blank. An example of another data location is a supplemental data field such as a discretionary data field, track 3, or field 55 (step 408).

The encrypted track data elements including the encrypted CVV and PAN in the supplemental data field are sent from the access device 15 to the issuer 22 (step 410). If desired, a fast Fourier transformation of track data elements and magnetic signature data may also be present in the supplemental data field to provide further security. The transaction data then pass through the merchant 16 and the acquirer 18 (step 412).

The encrypted CVV and PAN in the supplemental data field are then received and are then decrypted by the server computer 21 at the payment processing network 20 (step 414). A public or symmetric key, as appropriate, may be used to decrypt the encrypted CVV. In some cases, the blank CVV field in the received transaction data may indicate to the server computer 21 that it needs to look to the supplemental data field for the real CVV.

The server computer 21 determines that the received transaction data came from the access device 15 by using a terminal identifier or merchant identification value. After the access device 15 is identified, the appropriate key is retrieved from the key database 25. After the server computer 21 decrypts the CVV and PAN in the supplemental data field, it inserts the unencrypted CVV into the correct CVV data field in the data track, and then passes the transaction data including the unencrypted CVV to the issuer 22 (step 416). The additional piece of information embodied by the encrypted and subsequently unencrypted PAN may be also used by the server computer 21 to verify the authenticity of the portable consumer device being used.

The issuer 22 then processes the transaction as described above (step 418). That is, the authorization request message is reviewed to determine if the consumer is authorized to conduct the transaction. The issuer 22 then approves or declines the request, and an authorization response message is sent back to the access device 15 as described above.

Figure 7:
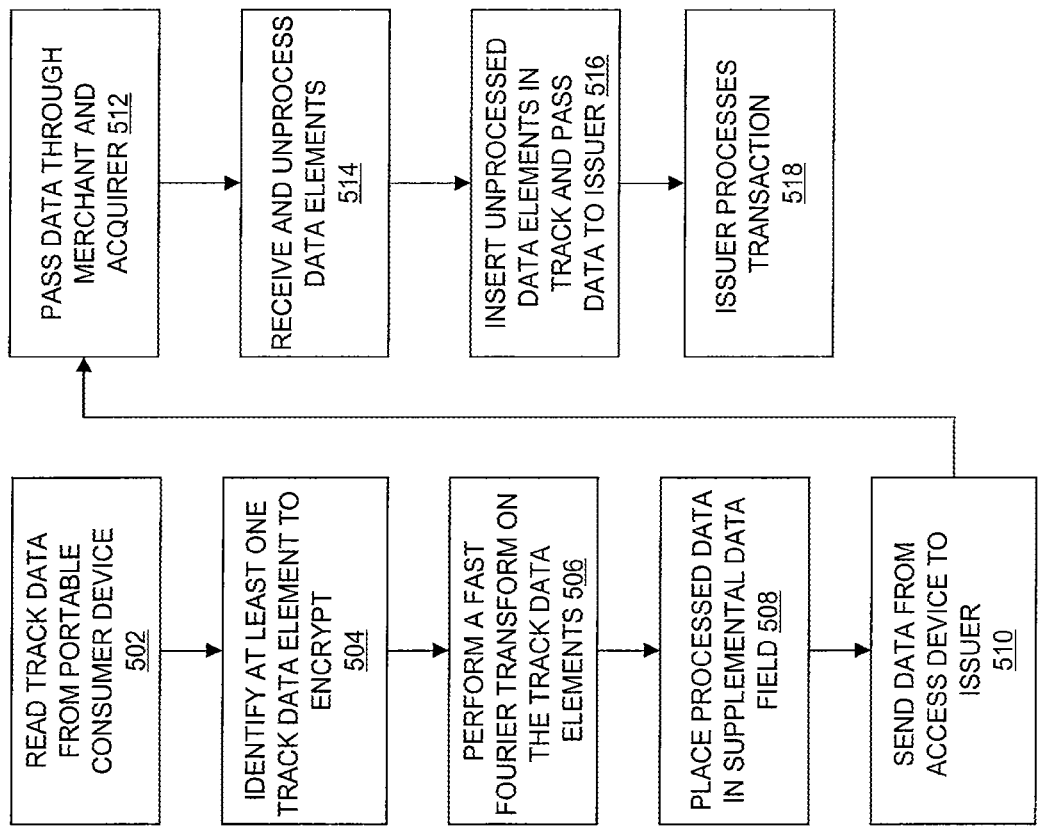

FIG. 7 shows an example that does not require the use of keys. Instead of keys, a data alteration process such as a fast Fourier transformation process can be used to alter a transaction data element such as a CVV. Other data transformation processes could be used in other embodiments of the invention.

Referring to FIG. 7 and FIG. 1, track data are read from a portable consumer device 12 (step 502). The access device 15 then identifies at least one track data element to encrypt (step 504). Steps 502 and 504 are similar to steps 202 and 204 above.

However, instead of encryption using a key, the access device 15 then processes a track data element such as a CVV using a fast Fourier transformation process (step 406). The access device 15 then alters the CVV track data element and then places it in a data location other than where the original CVV was obtained, and the original location is left blank. An example of another location is a supplemental data field such as a discretionary data field, field 55, or a field in track 3 (step 408).

The transaction data including the altered CVV that is located in the supplemental data field is sent from the access device 15 to the issuer 22 (step 510). The transaction data then pass through the merchant 16 and the acquirer 18 (step 512).

The altered CVV that is located in the supplemental data field is then received and is restored by the server computer 21 at the payment processing network 20 (step 414).

The server computer 21 determines that the received transaction data came from the access device 15 by using a terminal identifier or merchant identification value. After the access device 15 is identified, the appropriate algorithm is retrieved from the database 25 (in this case, the "key database" may be an "algorithm database"). The server computer 21 then restores the altered CVV using the appropriate algorithm, and then inserts the restored CVV into the data location that normally stores the CVV, and then passes the transaction data including the unaltered CVV to the issuer 22 (step 516).

The issuer 22 then processes the transaction as described above (step 518). That is, the authorization request message is reviewed to determine if the consumer is authorized to conduct the transaction. The issuer 22 then approves or declines the request, and an authorization response message is sent back to the access device 15 as described above.

Figure 8:
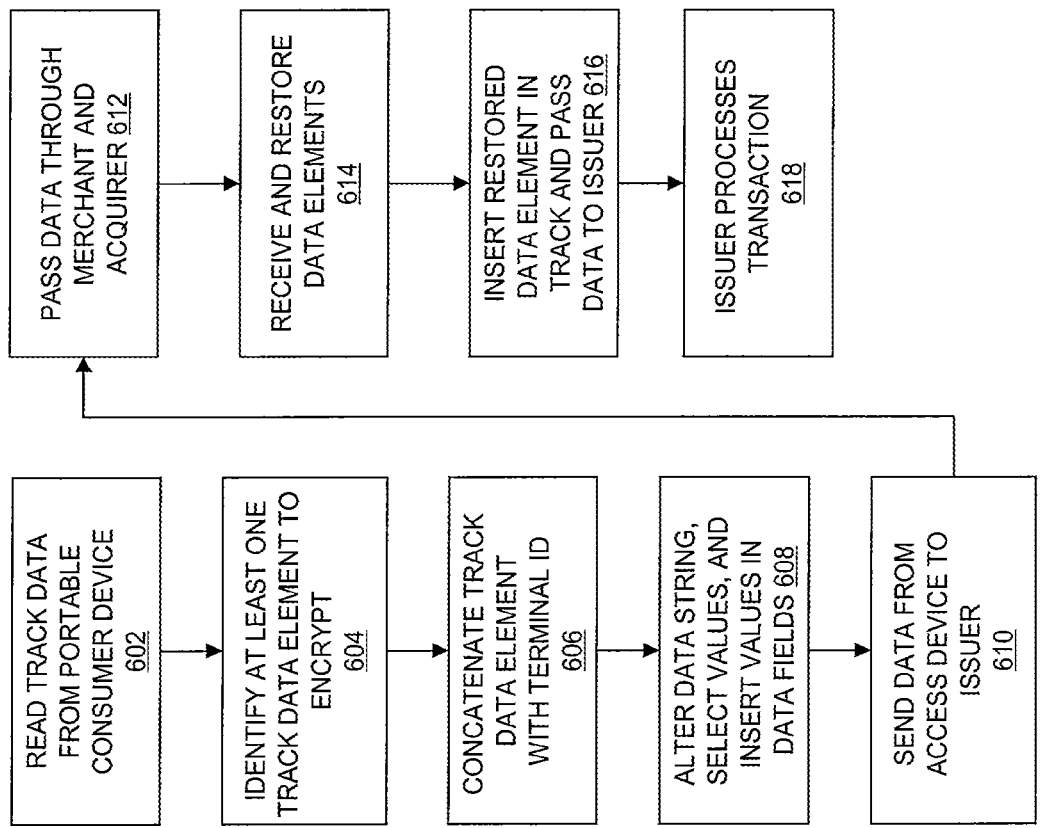

FIG. 8 shows a flowchart of an embodiment of the invention whereby one or more track data elements may be combined with a terminal identifier to form a data string, which may be encrypted and then further processed.

Referring to FIG. 8 and FIG. 1, track data are read from a portable consumer device 12 (step 602). The access device 15 then identifies at least one track data element to encrypt (step 604). Steps 602 and 604 are similar to steps 202 and 204 above.

However, in this example, track data elements and a terminal identifier are concatenated (step 606). For example, the consumer's PAN, CVV, and a terminal identifier could be concatenated to form a data string, which is subsequently altered (e.g., encrypted) using a symmetric key or some other algorithm to form a 256 bit value. The last three digits of the string are then extracted and inserted into the CVV data field in the location where the original CVV value was obtained (step 608).

The transaction data including the altered CVV is sent from the access device 15 to the issuer 22 (step 610). The transaction data then pass through the merchant 16 and the acquirer 18 (step 612).

The altered CVV is then received and is restored by the server computer 21 at the payment processing network 20 (step 614).

The server computer 21 determines that the received transaction data came from the access device 15 by using a terminal identifier or merchant identification value. After the access device 15 is identified, the appropriate algorithm is retrieved from the database 25 (in this case, the "key database" may be an "algorithm database"). The server computer 21 then restores the CVV using the selected algorithm, inserts the restored CVV into the data location that previously stored the altered CVV, and passes the transaction data including the unaltered CVV to the issuer 22 (step 616).

The issuer 22 then processes the transaction as described above (step 618). That is, the authorization request message is reviewed to determine if the consumer is authorized to conduct the transaction. The issuer 22 then approves or declines the request, and an authorization response message is sent back to the access device 15 as described above.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   generating, with an access device, an initial key based at least in part on an initialization interaction between the access device and a portable consumer device such that the initial key has first cryptographic properties including the initial key being a terminal-specific symmetric key that is unavailable for interception prior to the initialization interaction;
   altering, with the access device, the initial key with a public key to form an altered key having second cryptographic properties including an ability to obtain the initial key by further altering the altered key;
   sending, with the access device, the altered key and an identifier of the access device, wherein the sending of the altered key with the access device inhibits unauthorized interception of the unaltered initial key, and when received with one or more servers of a payment processing network the altered key is further altered to obtain the initial key which is then stored in a key storage location and associated with the identifier of the access device;
   altering, with the access device, transaction data with the initial key to form altered transaction data, the transaction data being associated with a financial transaction being conducted with the access device; and
   sending, with the access device, the altered transaction data to the one or more servers, wherein the one or more servers determine that the altered transaction data was altered with the initial key that is stored at the key storage location based at least in part on the associated identifier of the access device, and the altered transaction data is further altered using the initial key that is stored at the key storage location, the further altering of the altered transaction data enabled at least in part by the initial key having been generated based at least in part on the initialization interaction between the access device and the portable consumer device.

2. The method of claim 1 wherein the identifier is a terminal ID.

3. The method of claim 1 wherein the altered key is an encrypted symmetric key that was encrypted using a public key.

4. The method of claim 1 wherein the portable consumer device is a payment card.

5. The method of claim 1 further comprising:
   sending, with the access device, an altered identifier based at least in part on the identifier,
   wherein sending the altered key and the altered identifier data is part of a special initialization transaction that is different from a transaction associated with a purchase at least in that the initialization transaction is initial with respect to later transactions associated with purchases.

6. The method of claim 1 wherein the initialization interaction comprises using the portable consumer device to interact with the access device in a financial transaction.

7. The method of claim 6 wherein the altering comprises performing an encryption process, the access device being capable of performing the encryption process.

8. The method of claim 7 wherein the encryption process comprises elliptical curve cryptography.

9. The method of claim 1 wherein a host computer is coupled to the access device.

10. The method of claim 9 wherein the public key is stored in the host computer.

11. The method of claim 9 wherein the host computer generates the initial key.

12. The method of claim 9 wherein the host computer performs the altering.

13. An access device configured to, at least:
   generate an initial key based at least in part on an initialization interaction between the access device and a portable consumer device such that the initial key has first cryptographic properties including the initial key being a terminal-specific symmetric key that is unavailable for interception prior to the initialization interaction;
   alter the initial key with a public key to form an altered key having second cryptographic properties including an ability to obtain the initial key by further altering the altered key;
   send the altered key and an identifier of the access device, wherein the sending of the altered key with the access device inhibits unauthorized interception of the unaltered initial key, and when received with one or more servers of a payment processing network the altered key is further altered to obtain the initial key which is then stored in a key storage location and associated with the identifier of the access device;
   alter transaction data with the initial key to form altered transaction data, the transaction data being associated with a financial transaction being conducted with the access device; and
   send the altered transaction data to the one or more servers, wherein the one or more servers determine that the altered transaction data was altered with the initial key that is stored at the key storage location based at least in part on the associated identifier of the access device, and the altered transaction data is further altered using the initial key that is stored at the key storage location, the further altering of the altered transaction data enabled at least in part by the initial key having been generated based at least in part on the initialization interaction between the access device and the portable consumer device.

14. The access device of claim 13, wherein:
the access device is further configured to send an altered identifier based at least in part on the identifier; and
sending the altered key and the altered identifier data is part of a special initialization transaction that is different from a transaction associated with a purchase at least in that the initialization transaction is initial with respect to later transactions associated with purchases.

15. The access device of claim 13 wherein the initialization interaction comprises using the portable consumer device to interact with the access device in a financial transaction.

* * * * *